United States Patent
Bourgeois

(10) Patent No.: US 6,245,133 B1
(45) Date of Patent: Jun. 12, 2001

(54) GAS CONDENSING AND COOLING SYSTEM

(76) Inventor: Reed L. Bourgeois, 192 W. 126 St., Cutoff, LA (US) 70345

(*) Notice: Subject to any disclaimer, the term of this patent is extended or adjusted under 35 U.S.C. 154(b) by 0 days.

(21) Appl. No.: 09/325,278

(22) Filed: Jun. 3, 1999

(51) Int. Cl.⁷ ............................. B01D 45/00; F28D 7/10
(52) U.S. Cl. ............................. 96/414; 96/290; 96/333; 95/211; 95/268; 95/274; 95/288; 55/342.1; 55/434.2; 165/155
(58) Field of Search .......................... 96/333, 290, 295, 96/414, 416, 415; 95/211, 274, 288, 268; 62/7, 86; 165/60, 913, DIG. 223, 164, DIG. 17, 186, DIG. 402, 910, 142, DIG. 450, 155; 55/342, 342.1, 342.2, DIG. 30, 434.2, 512

(56) References Cited

U.S. PATENT DOCUMENTS

| | | | | |
|---|---|---|---|---|
| 1,800,771 | * | 4/1931 | Best ........................................ 55/342 |
| 3,791,102 | * | 2/1974 | Huntington ............................ 165/60 |
| 3,831,377 | * | 8/1974 | Morin .............................. 55/DIG. 30 |
| 3,991,690 | * | 11/1976 | Bork ............................... 55/DIG. 30 |
| 3,999,967 | * | 12/1976 | Aoi ................................. 55/DIG. 30 |
| 4,440,217 | * | 4/1984 | Stieler ................................... 165/155 |
| 4,490,985 | * | 1/1985 | Wells ........................................ 62/86 |
| 4,585,053 | * | 4/1986 | Kaufman et al. ..................... 165/142 |
| 4,597,272 | * | 7/1986 | Marx, II et al. ................ 261/DIG. 72 |
| 4,793,834 | | 12/1988 | Tippmer et al. .......................... 55/85 |
| 4,997,464 | * | 3/1991 | Kopf ....................................... 96/416 |
| 5,045,094 | * | 9/1991 | Paranjpe ................................. 95/273 |
| 5,141,536 | | 8/1992 | Schievelbein et al. ................. 55/208 |
| 5,209,762 | | 5/1993 | Lowell ..................................... 55/31 |
| 5,399,188 | | 3/1995 | Roberts ................................... 95/52 |
| 5,536,303 | | 7/1996 | Ebiling .................................. 95/166 |
| 5,665,144 | | 9/1997 | Hill et al. .............................. 95/179 |

* cited by examiner

Primary Examiner—Duane Smith
Assistant Examiner—Jason M. Greene
(74) Attorney, Agent, or Firm—Joseph N. Breaux

(57) ABSTRACT

A gas condensing and cooling system for cooling hot vaporous emissions from a hot vaporous emissions source to a level below prescribed regulatory limits that includes a cooling unit that operates using a readily available pressurized natural gas as the refrigerant element within the cooling unit and includes a multi-chamber condenser unit having a number of chambers each containing a volume of porous rock suspended above a liquid barrier.

1 Claim, 4 Drawing Sheets

GAS CONDENSING AND COOLING SYSTEM

TECHNICAL FIELD

The present invention relates to emissions reducing equipment and more particularly to a gas condensing and cooling system including a multi-chamber condenser unit connectable to a heated vapor emissions source and a cooling unit connected to the multi-chamber condenser unit; the multi-chamber condenser unit including a chamber housing having a number of condensing elements connected sequentially together therein, a condensate level viewing glass and a condensate drain valve; each condensing element including a volume of porous rock within a compartment partially defined by a vertical divider wall and suspended over a liquid barrier created by condensate; each condensing element being connected to an adjacent condensing element in a manner such that heated vapor emissions traveling through the multi-chamber condenser between the input opening and the discharge opening of the multi-chamber condenser unit must pass sequentially through each of the number of condensing elements of the multi-chamber condenser unit; the cooling unit including a length of vapor discharge pipe having a vent passageway formed along the length thereof terminating in a condenser unit discharge input opening at one end in connection with the condenser unit discharge opening and open to the atmosphere at the other end, an insulated natural gas expansion chamber surrounding a portion of the vapor discharge pipe, a pressure reducing element having a lower pressure end connected to a gas input opening of the insulated natural gas expansion chamber a higher pressure input end connectable to a source of pressurized natural gas, and an expanded gas vent tube extending out of the insulated natural gas expansion chamber and running along the vent passageway through the portion of the vapor discharge pipe surrounded by the insulated natural gas expansion chamber to provide a vapor contact cooling structure.

BACKGROUND ART

Environmental regulations typically restrict the temperature content of emissions from oil field production equipment such as the hot vaporous emissions from a glycol dehydration unit. It would be a benefit, therefore, to have an emission cooling system for cooling the emissions sufficiently to satisfy regulations. Because cooling equipment utilizing compressors and the like break down and require maintenance, it would be a further benefit to have a gas condensing and cooling system for cooling and collecting condensate that operated without a compressor unit and that utilized readily available pressurized natural gas as the refrigerant element within the cooling unit.

GENERAL SUMMARY DISCUSSION OF INVENTION

It is thus an object of the invention to provide a gas condensing and cooling system that includes a multi-chamber condenser unit connectable to a heated vapor emissions source and a cooling unit connected to the multi-chamber condenser unit; the multi-chamber condenser unit including a chamber housing having a number of condensing elements connected sequentially together therein, a condensate level viewing glass and a condensate drain valve; each condensing element including a volume of porous rock within a compartment partially defined by a vertical divider wall and suspended over a liquid barrier created by condensate; each condensing element being connected to an adjacent condensing element in a manner such that heated vapor emissions traveling through the multi-chamber condenser between the input opening and the discharge opening of the multi-chamber condenser unit must pass sequentially through each of the number of condensing elements of the multi-chamber condenser unit; the cooling unit including a length of vapor discharge pipe having a vent passageway formed along the length thereof terminating in a condenser unit discharge input opening at one end in connection with the condenser unit discharge opening and open to the atmosphere at the other end, an insulated natural gas expansion chamber surrounding a portion of the vapor discharge pipe, a pressure reducing element having a lower pressure end connected to a gas input opening of the insulated natural gas expansion chamber a higher pressure input end connectable to a source of pressurized natural gas, and an expanded gas vent tube extending out of the insulated natural gas expansion chamber and running along the vent passageway through the portion of the vapor discharge pipe surrounded by the insulated natural gas expansion chamber to provide a vapor contact cooling structure.

Accordingly, a gas condensing and cooling system is provided. The gas condensing and cooling system includes a multi-chamber condenser unit connectable to a heated vapor emissions source and a cooling unit connected to the multi-chamber condenser unit; the multi-chamber condenser unit including a chamber housing having a number of condensing elements connected sequentially together therein, a condensate level viewing glass and a condensate drain valve; each condensing element including a volume of porous rock within a compartment partially defined by a vertical divider wall and suspended over a liquid barrier created by condensate; each condensing element being connected to an adjacent condensing element in a manner such that heated vapor emissions traveling through the multi-chamber condenser between the input opening and the discharge opening of the multi-chamber condenser unit must pass sequentially through each of the number of condensing elements of the multi-chamber condenser unit; the cooling unit including a length of vapor discharge pipe having a vent passageway formed along the length thereof terminating in a condenser unit discharge input opening at one end in connection with the condenser unit discharge opening and open to the atmosphere at the other end, an insulated natural gas expansion chamber surrounding a portion of the vapor discharge pipe, a pressure reducing element having a lower pressure end connected to a gas input opening of the insulated natural gas expansion chamber a higher pressure input end connectable to a source of pressurized natural gas, and an expanded gas vent tube extending out of the insulated natural gas expansion chamber and running along the vent passageway through the portion of the vapor discharge pipe surrounded by the insulated natural gas expansion chamber to provide a vapor contact cooling structure.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

EXEMPLARY MODE FOR CARRYING OUT THE INVENTION

Figure 1:
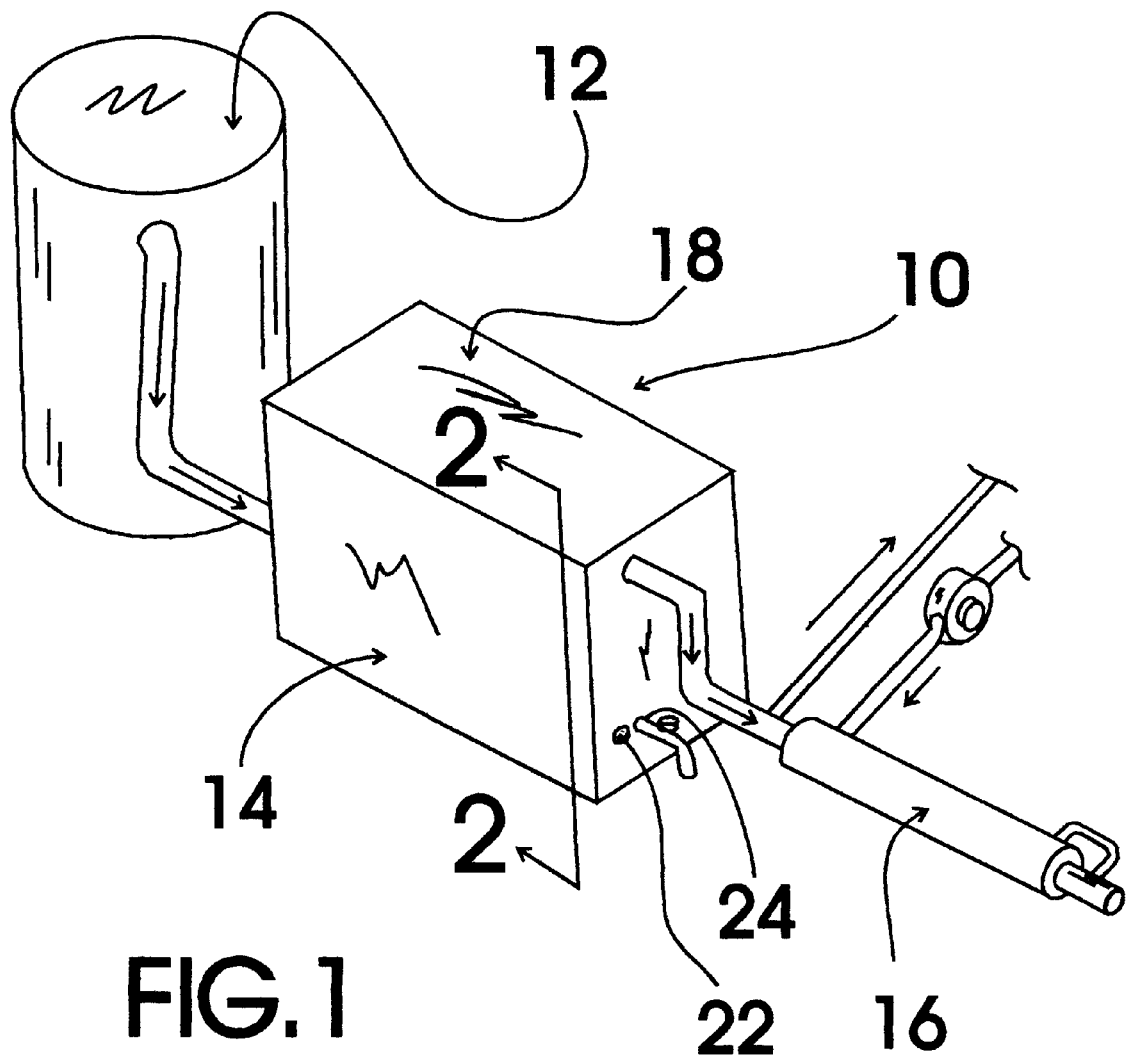
FIG. 1 is a perspective view of an exemplary embodiment of the gas condensing and cooling system of the present invention showing the feed pipe in connection with the input opening of an exemplary embodiment of the multi-chamber condenser unit and connected to the output of a representative glycol dehydration unit and the discharge opening of the exemplary multi-chamber condenser unit connected to the condenser unit discharge input opening of an exemplary embodiment of the natural gas cooling unit; the multi-chamber condenser unit including a chamber housing having four condensing elements connected sequentially together therein, a condensate level viewing glass and a condensate drain valve; each condensing element including a volume of porous rock within a compartment partially defined by vertical divider walls and suspended over a liquid barrier created by condensate; each condensing element being connected to adjacent condensing elements in a manner such that the heated water vapor driven off the glycol within the glycol dehydration unit and traveling between the input opening and the discharge opening of the multi-chamber condenser unit must pass sequentially through each of the four condensing elements of the multi-chamber condenser unit out through the condenser unit discharge opening; the natural gas cooling unit including a length of vapor discharge pipe having a vent passageway formed along the length thereof terminating in a condenser unit discharge input opening at one end and open to the atmosphere at the other end, and surrounded along a portion thereof by an insulated natural gas expansion chamber, a pressure reducing element connected to the input opening of the insulated natural gas expansion chamber, and an expanded gas vent tube extending out of the insulated natural gas expansion chamber and running along the vent passageway through the portion of the vapor discharge pipe surrounded by the insulated natural gas expansion chamber to provide a vapor contact cooling structure.

FIG. 1 shows an exemplary embodiment of the gas condensing and cooling system of the present invention, generally designated 10, in connection with the output of a representative glycol dehydration unit, generally designated 12. Gas condensing and cooling system 10 includes a multi-chamber condenser unit, generally designated 14, and a cooling unit, generally designated 16.

Figure 2:
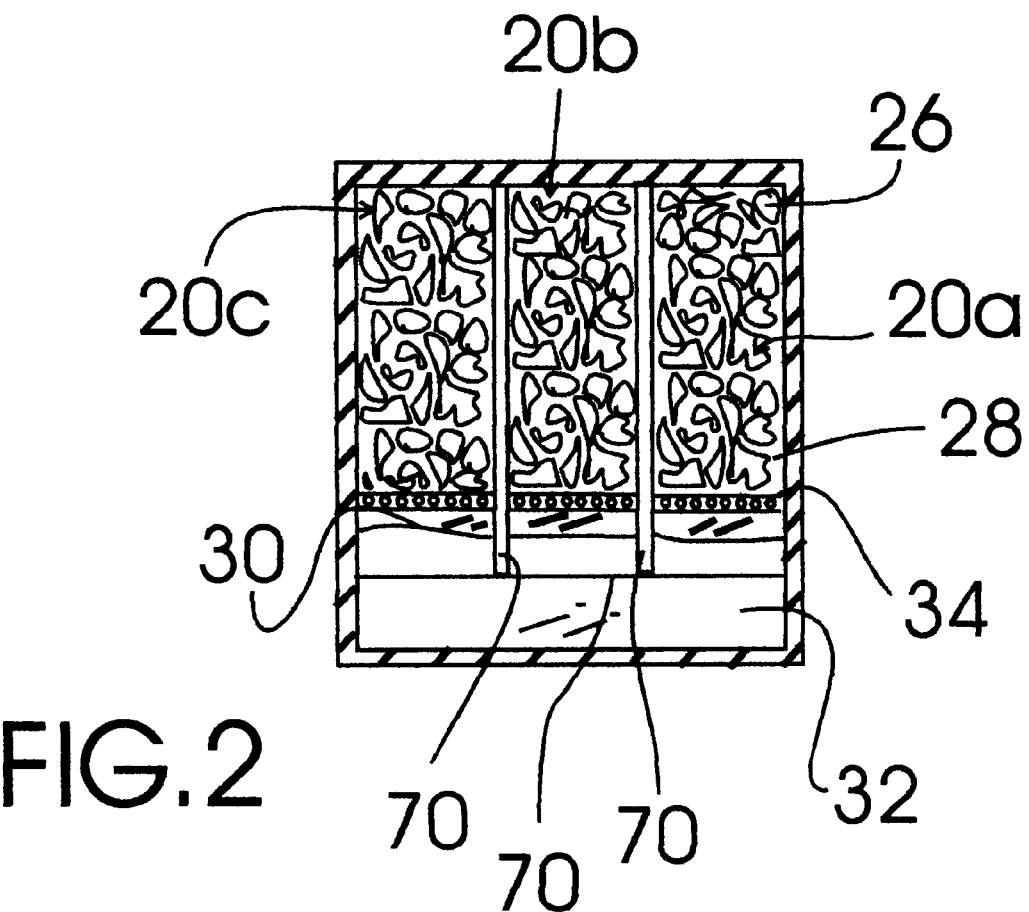
FIG. 2 is a cross sectional view of the multi-chamber condenser unit of FIG. 1 along the line II—II showing three of the four condensing elements showing the volume of porous rock within each compartment, the two vertical divider walls partially defining each of the three compartments, the liquid barrier positioned within the bottom of the chamber housing, the three wire mesh dividers suspending the porous rock above the liquid barrier, and the bottom edge of the vertical divider walls extending down into the liquid barrier.
Figure 3:
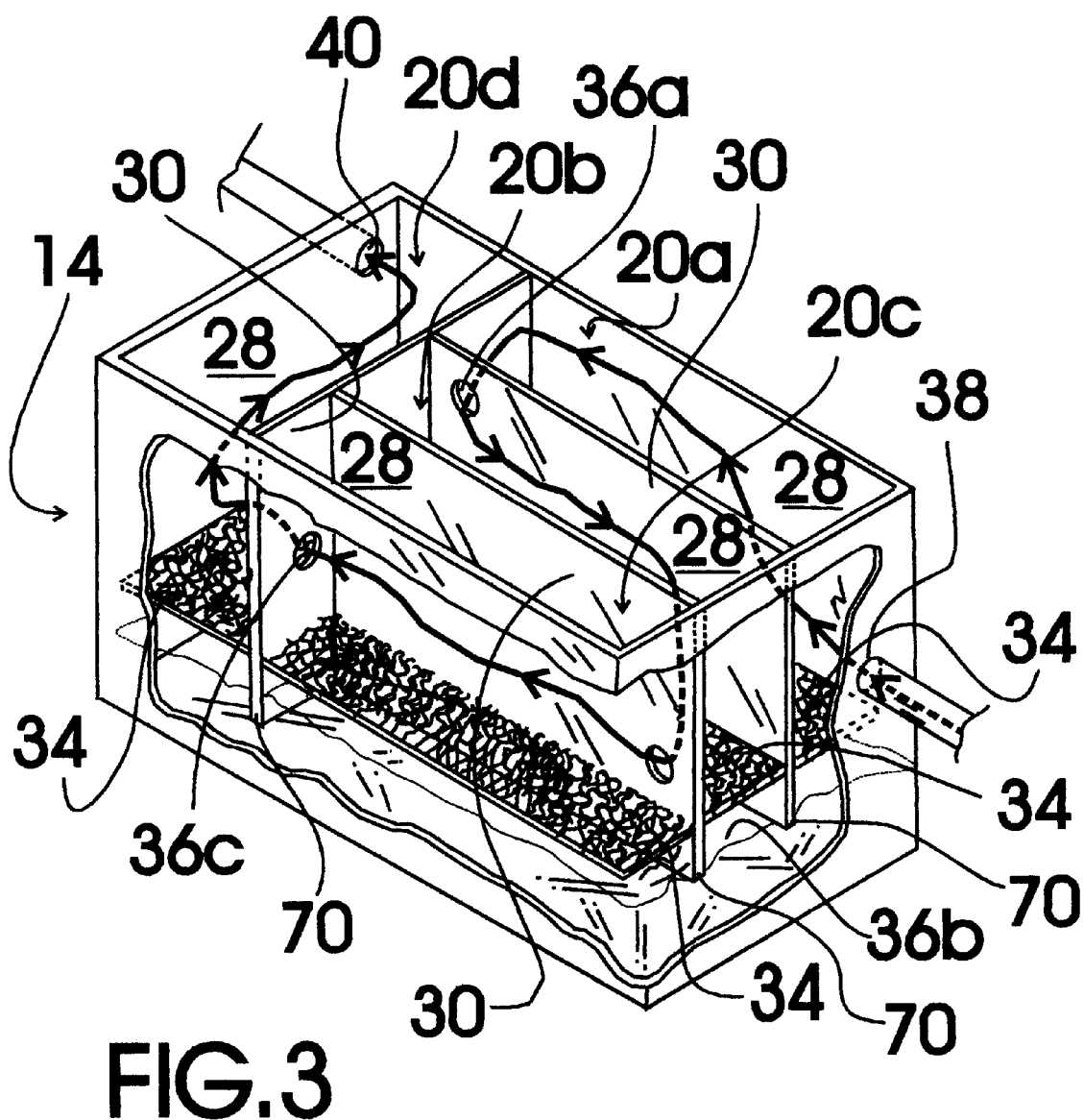
FIG. 3 is a cutaway view of the multi-chamber condenser unit of FIG. 1 in isolation with the porous rocks removed from each of the four compartments of the condensing elements, the four compartments being sequentially connected by flow openings provided through the three vertical divider walls.

Multi-chamber condenser unit 14 includes a chamber housing 18, having four condensing elements, generally designated 20a–d (FIGS. 2 and 3) connected sequentially together therein, a condensate level viewing glass 22 and a condensate drain valve 24. Referring to FIG. 2, each condensing element 20a–d includes a volume of porous lava rock 26 within a compartment 28 partially defined by a vertical divider wall 30 and suspended over a liquid barrier 32 created by condensate dripping from the porous lava rock by a screen 34 (see also FIG. 3). Referring to FIG. 3, each condensing element 20 is connected to adjacent condensing elements 20 by one of three a flow openings 36a–c in a manner such that heated water vapor traveling between the input opening 38 and the discharge opening 40 of multi-chamber condenser unit 14 must pass sequentially through each of the four condensing elements 20.

Figure 5:
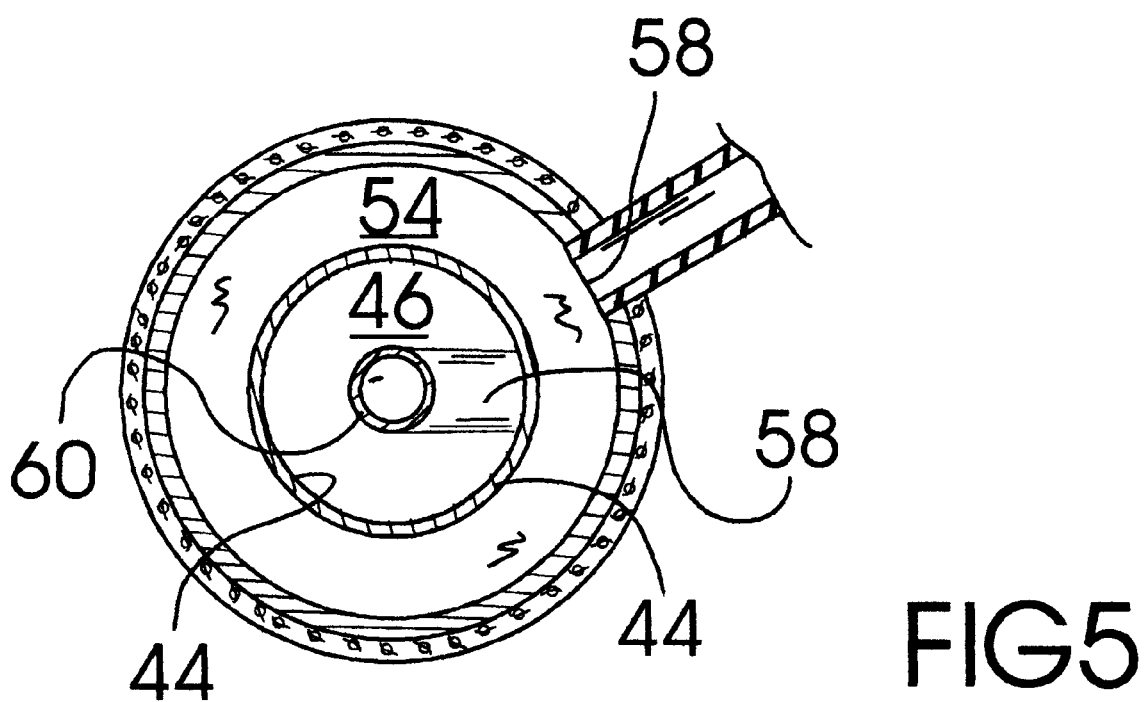
FIG. 5 is a cross sectional view of the natural gas cooling unit along the line V—V of FIG. 4 showing the vent passageway of the vapor discharge pipe, the insulated natural gas expansion chamber, the input opening of the insulated natural gas expansion chamber, and a section of the expanded gas vent tube positioned within the center of the vent passageway.
Figure 4:
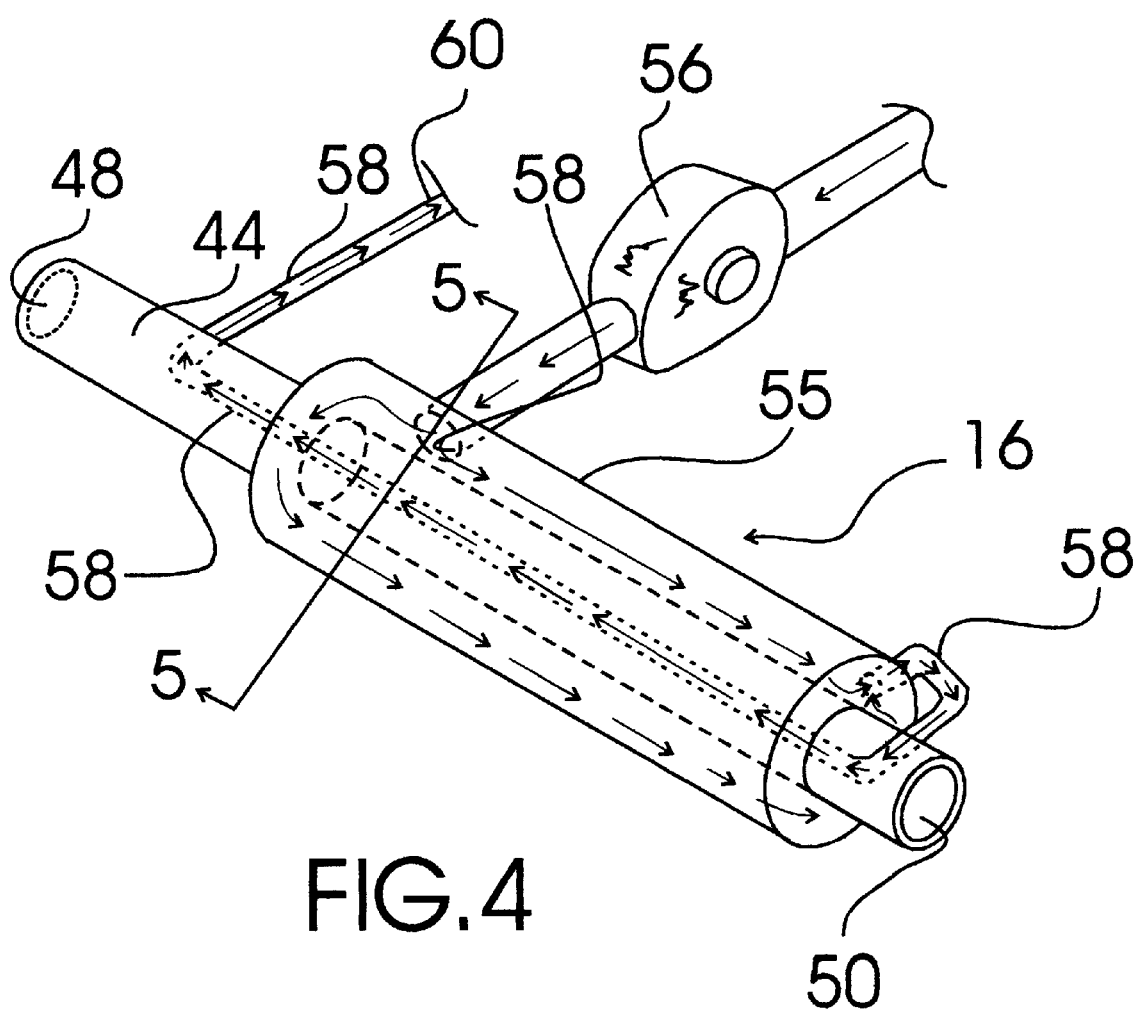
FIG. 4 is a perspective view of the natural gas cooling unit in isolation showing the length of vapor discharge pipe including the vent passageway formed along the length thereof terminating in a condenser unit discharge input opening at one end and open to the atmosphere at the other end, the insulated natural gas expansion chamber, the pressure reducing element connected to the input opening of the insulated natural gas expansion chamber, and the expanded gas vent tube extending out of the insulated natural gas expansion chamber and running along the vent passageway through the portion of the vapor discharge pipe surrounded by the insulated natural gas expansion chamber to provide a vapor contact cooling structure.

Referring to FIG. 4, cooling unit 16 includes a length of vapor discharge pipe 44 having a vent passageway 46 (FIG. 5) formed along the length thereof terminating in a condenser unit discharge input opening 48 at one end and open to the atmosphere at the other end 50 and surrounded along a portion thereof by an insulated natural gas expansion chamber 54 (FIG. 5) formed within an expansion chamber defining structure 55, a pressure reducing regulator 56 connected between the input opening 58 of insulated natural gas expansion chamber 54 and a high pressure supply of natural gas, and an expanded gas vent tube 58 extending out of the insulated natural gas expansion chamber structure 55 and, referring now to FIG. 5, running along the vent passageway 46 through the portion of the vapor discharge pipe 44 surrounded by the insulated natural gas expansion chamber 54 to provide a vapor contact cooling structure 60 within vent passageway 46. The end 60 of expanded gas vent tube 58 is in connection with a tank supplying production equipment using lower pressure natural gas.

With general reference to FIGS. 1–5, in use hot vaporous emissions are emitted from glycol dehydration unit 12 at a head pressure of less than about two ounces and travel sequentially through each of four condensing elements 20a–d where some cooling occurs creating condensate on the porous lava rocks 26 which drips down into the liquid barrier 32. Condensate drain valve 24 is connected to liquid barrier 32 at a level above the bottom ends 70 (FIG. 2) of vertical divider walls 30. This allows condensate to be continuously removed from liquid barrier 32 without lowering the level of liquid barrier 32 to a point where a passageway is created between compartments 28 of condenser elements 20a–d beneath bottom ends 70 of vertical divider walls 30. As the cooler less vaporous emissions emerge from discharge opening 40 of multi-chamber condenser unit 14 they enter vent passageway 46 of vapor discharge pipe 44 through discharge input opening 48. As the vaporous emissions travel along vent passageway 46 the vapors contact the cold interior wall 78 (FIG. 5) of discharge pipe 44 and the vapor contact cooling structure 60, in this example the exterior surface of expanded gas vent tube 58, within vent passageway 46 losing heat and exiting to the atmosphere at the other end 50 of vapor discharge pipe 44 at an average temperature of sixty degrees Fahrenheit.

It can be seen from the preceding description that a gas condensing and cooling system has been provided that includes a multi-chamber condenser unit connectable to a heated vapor emissions source and a cooling unit connected to the multi-chamber condenser unit; the multi-chamber condenser unit including a chamber housing having a number of condensing elements connected sequentially together therein, a condensate level viewing glass and a condensate drain valve; each condensing element including a volume of porous rock within a compartment partially defined by a vertical divider wall and suspended over a liquid barrier created by condensate; each condensing element being connected to an adjacent condensing element in a manner such that heated vapor emissions traveling through the multi-chamber condenser between the input opening and the discharge opening of the multi-chamber condenser unit must pass sequentially through each of the number of condensing elements of the multi-chamber condenser unit; the cooling unit including a length of vapor discharge pipe having a vent passageway formed along the length thereof terminating in a condenser unit discharge input opening at one end in connection with the condenser unit discharge opening and open to the atmosphere at the other end, an insulated natural gas expansion chamber surrounding a portion of the vapor discharge pipe, a pressure reducing element having a lower pressure end connected to a gas input opening of the insulated natural gas expansion chamber a higher pressure input end connectable to a source of pressurized natural gas, and an expanded gas vent tube extending out of the insulated natural gas expansion chamber and running along the vent passageway through the portion of the vapor discharge pipe surrounded by the insulated natural gas expansion chamber to provide a vapor contact cooling structure.

It is noted that the embodiment of the gas condensing and cooling system described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A gas condensing and cooling system for cooling a collecting condensate from a heated vapor emissions source, said gas condensing and cooling system comprising:

a multi-chamber condenser unit connectable to a heated vapor emissions source; and a cooling unit connected to said multi-chamber condenser unit;

said multi-chamber condenser unit including a chamber housing having a number of condensing elements connected sequentially together therein, a condensate level viewing glass and a condensate drain valve;

each condensing element including a volume of porous rock within a compartment partially defined by a vertical divider wall and suspended over a liquid barrier created by condensate;

each condensing element being connected to an adjacent condensing element in a manner such that heated vapor emissions traveling through said multi-chamber condenser between said input opening and said discharge opening of said multi-chamber condenser unit must pass sequentially through each of said number of condensing elements of said multi-chamber condenser unit;

said cooling unit including a length of vapor discharge pipe having a vent passageway formed along the length thereof terminating in a condenser unit discharge input opening at one end in connection with said condenser unit discharge opening and open to the atmosphere at the other end, an insulated natural gas expansion chamber surrounding a portion of said vapor discharge pipe, a pressure reducing element having a lower pressure end connected to a gas input opening of said insulated natural gas expansion chamber and a higher pressure input end connectable to a source of pressurized natural gas, and an expanded gas vent tube extending out of said insulated natural gas expansion chamber and running along said vent passageway through said portion of said vapor discharge pipe surrounded by said insulated natural gas expansion chamber to provide a vapor contact cooling structure.

* * * * *